US012096537B2

(12) United States Patent
Morita et al.

(10) Patent No.: US 12,096,537 B2
(45) Date of Patent: Sep. 17, 2024

(54) POSITION ESTIMATION APPARATUS, POSITION ESTIMATION SYSTEM, AND POSITION ESTIMATION METHOD

(71) Applicant: Panasonic Intellectual Property Management Co., Ltd., Osaka (JP)

(72) Inventors: Junichi Morita, Tokyo (JP); Naganori Shirakata, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 332 days.

(21) Appl. No.: 17/586,615

(22) Filed: Jan. 27, 2022

(65) Prior Publication Data

US 2022/0330409 A1 Oct. 13, 2022

Related U.S. Application Data

(63) Continuation of application No. PCT/JP2020/029129, filed on Jul. 29, 2020.

(30) Foreign Application Priority Data

Aug. 2, 2019 (JP) ................................. 2019-143111

(51) Int. Cl.
*H04W 4/029* (2018.01)
*H04B 17/318* (2015.01)
(Continued)

(52) U.S. Cl.
CPC ........... *H05B 47/19* (2020.01); *H04B 17/318* (2015.01); *H04W 4/029* (2018.02); *H04W 24/08* (2013.01); *H04W 64/00* (2013.01)

(58) Field of Classification Search
CPC ..... H04W 24/08; H04W 24/10; H04W 4/029; H04W 64/00
(Continued)

(56) References Cited

U.S. PATENT DOCUMENTS 9,408,268 B2 * 8/2016 Recker .................... H02J 50/40
10,659,919 B1 * 5/2020 Li ........................ H04L 61/5038
(Continued)

FOREIGN PATENT DOCUMENTS

JP 2002-300652 A 10/2002
JP 2003-520519 A 7/2003
(Continued)

OTHER PUBLICATIONS

International Search Report, mailed Oct. 27, 2020, for International Application No. PCT/JP2020/029129. (6 pages).

*Primary Examiner* — Joseph Arevalo
(74) *Attorney, Agent, or Firm* — Seed IP Law Group LLP

(57) ABSTRACT

A position estimation apparatus includes a selection circuit and an estimation circuit. The selection circuit selects at least one radio electronic device as an anchor used for estimating a position of a mobile terminal, based on first information and second information, the first information being related to an arrangement in a first region in which at least one of radio electronic devices including the at least one radio electronic device is arranged, the second information being related to a second region within which the mobile terminal is movable in the first region. The estimation circuit estimates a position of the mobile terminal based on third information related to radio communication quality between the anchor and the mobile terminal and on information related to the anchor in the first information.

8 Claims, 15 Drawing Sheets

(51) Int. Cl.
*H04W 24/08* (2009.01)
*H04W 64/00* (2009.01)
*H05B 47/19* (2020.01)

(58) Field of Classification Search
USPC ........ 370/254, 331, 328, 329, 252, 336, 338
See application file for complete search history.

(56) References Cited

U.S. PATENT DOCUMENTS

| | | | |
|---|---|---|---|
| 2003/0148774 A1 | 8/2003 | Naghian et al. | |
| 2004/0258012 A1 | 12/2004 | Ishii | |
| 2014/0286644 A1* | 9/2014 | Oshima | H04B 10/11 398/118 |
| 2015/0296599 A1* | 10/2015 | Recker | H05B 47/11 315/153 |
| 2015/0351071 A1* | 12/2015 | Pandey | H04W 4/02 455/456.1 |
| 2017/0265037 A1* | 9/2017 | Sawada | H04W 64/003 |
| 2018/0007516 A1 | 1/2018 | Ge et al. | |
| 2018/0102846 A1* | 4/2018 | Aoyama | G06F 16/51 |
| 2018/0168020 A1* | 6/2018 | Casey | H05B 47/125 |
| 2019/0250265 A1* | 8/2019 | Lu | G01S 13/56 |
| 2019/0268072 A1* | 8/2019 | Aoyama | H04B 10/116 |
| 2019/0297243 A1* | 9/2019 | Oshima | H04N 23/73 |
| 2021/0396889 A1* | 12/2021 | Yoshino | G01S 19/22 |
| 2021/0409909 A1* | 12/2021 | Takahashi | H04W 4/33 |
| 2022/0345988 A1* | 10/2022 | Ong | H04W 48/02 |
| 2023/0019044 A1* | 1/2023 | Bora | H04W 52/383 |

FOREIGN PATENT DOCUMENTS

| | | |
|---|---|---|
| JP | 2004-350088 A | 12/2004 |
| JP | 2008-241684 A | 10/2008 |
| JP | 4973378 B2 | 7/2012 |
| JP | 2015-161540 A | 9/2015 |
| JP | 2018-507588 A | 3/2018 |

* cited by examiner

MOVABLE REGION INFORMATION
121

| TERMINAL TYPE | TERMINAL IDENTIFIER | MOVABLE REGION | |
|---|---|---|---|
| | | UPPER LEFT CORNER MINIMUM VALUE | LOWER RIGHT CORNER MAXIMUM VALUE |
| EMPLOYEE | 40-2,40-3... | (X0,Y0) | (X1,Y2) |
| CUSTOMER | 40-1... | (X0,Y0) | (X1,Y1) |
| EMPLOYEE | 40-4... | (X0,Y1) | (X1,Y2) |

FIG. 5

ANCHOR INFORMATION
123

| TERMINAL IDENTIFIER | ANCHOR (LIGHTING FIXTURE) IDENTIFIER | | | | | |
|---|---|---|---|---|---|---|
| | No.1 | No.2 | No.3 | No.4 | No.5 | No.6 |
| 40-1 | 30-x1 | 30-x2 | 30-x3 | 30-x4 | 30-x5 | 30-x6 |
| 40-2 | 30-y1 | 30-y2 | 30-y3 | 30-y4 | 30-y5 | 30-y6 |

FIG. 7

POSITION ESTIMATION APPARATUS, POSITION ESTIMATION SYSTEM, AND POSITION ESTIMATION METHOD

TECHNICAL FIELD

The present disclosure relates to a position estimation apparatus, a position estimation system, and a position estimation method.

BACKGROUND ART

A technique utilizing a radio node with a known installation position has been known in order to estimate a position of a terminal in, for example, a building where positioning signals from a satellite positioning system (e.g., Global Positioning System (GPS)) is hard to reach. In one example, Patent Literature (hereinafter referred to as "PTL") 1 discloses a technique estimating the location of the terminal with high accuracy by selecting the number of radio nodes (hereinafter referred to as "anchor") used in location estimation of the terminal based on the reliability of the anchor. Specifically, PTL 1 discloses repetition of the following processes of: estimating the location of the terminal by using a plurality of anchors; calculating the reliability of each of the anchors by using the estimated location; and estimating again the location of the terminal by using a plurality of anchors excluding anchors with low reliability.

CITATION LIST

Patent Literature

PTL 1
Japanese Patent Application Laid-Open No. 2008-241684

SUMMARY OF INVENTION

However, in the technique disclosed in PTL 1, the above-described processes are repeated, which takes a long time to estimate the position of the terminal.

One non-limiting and exemplary embodiment of the present disclosure facilitates providing a technique for shortening the time required for estimating a position of a terminal, using radio.

A position estimation apparatus according to an aspect of the present disclosure includes: a selection circuit that selects at least one radio electronic device as an anchor used for estimating a position of a mobile terminal, based on first information and second information, the first information being related to an arrangement in a first region in which at least one of radio electronic devices including the at least one radio electronic device is arranged, the second information being related to a second region within which the mobile terminal is movable in the first region; and an estimation circuit that estimates a position of the mobile terminal based on third information related to radio communication quality between the anchor and the mobile terminal and on information related to the anchor in the first information.

It should be noted that general or specific embodiments may be implemented as a system, an apparatus, a method, an integrated circuit, a computer program, a storage medium, or any selective combination thereof.

According to a non-limiting embodiment of the present disclosure, it is possible to shorten the time required for estimating a position of a mobile terminal, using radio.

Additional benefits and advantages of an aspect of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 5 illustrates an example of movable region information according to the embodiment;

FIG. 7 illustrates an example of anchor information according to the embodiment;

DESCRIPTION OF EMBODIMENTS

Hereinafter, an embodiment according to the present disclosure will be described in detail with reference to the accompanying drawings. Note that: the embodiment described below is an example; and the present disclosure is not limited by the embodiment.

In recent years, introduction of lighting fixtures supporting radio communication into commercial facilities and/or the like has been increasing. One of the advantages of a lighting fixture supporting the radio communication is its "simple operation." For example, via the radio communication, operations such as turning on and off as well as dimming of a designated lighting fixture can be easily performed from a device at hand (e.g., remote controller).

Since lighting fixtures are fixedly installed on a ceiling and the like during, for example, construction of a building, installation positions of the lighting fixtures are known. Thus, it is conceivable to utilize lighting fixtures supporting the radio communication as anchors for estimating positions of terminals carried by persons in the building (or terminals provided on mobile objects). This reduces labor and cost for installing new radio nodes as anchors for position estimation for terminals.

A plurality of lighting fixtures is arranged on, for example, the ceiling. Thus, when all of lighting fixtures are used as anchors, the amount of information transmitted and received to and from lighting fixtures for the position estimation for a terminal becomes enormous; as a result, the time required for a process of estimating a position (hereinafter may be also referred to as a position-estimation process) of the terminal increases. In this case, as to a mobile terminal, a position indicated by the position-estimation process and an actual position may be different from each other. The present embodiment shortens the time required for position estimation for a terminal, using a lighting fixture supporting the radio communication. Thus, for example, it is possible to improve the accuracy of position estimation for a mobile terminal.

Embodiment

<Position Estimation System>

Figure 1:
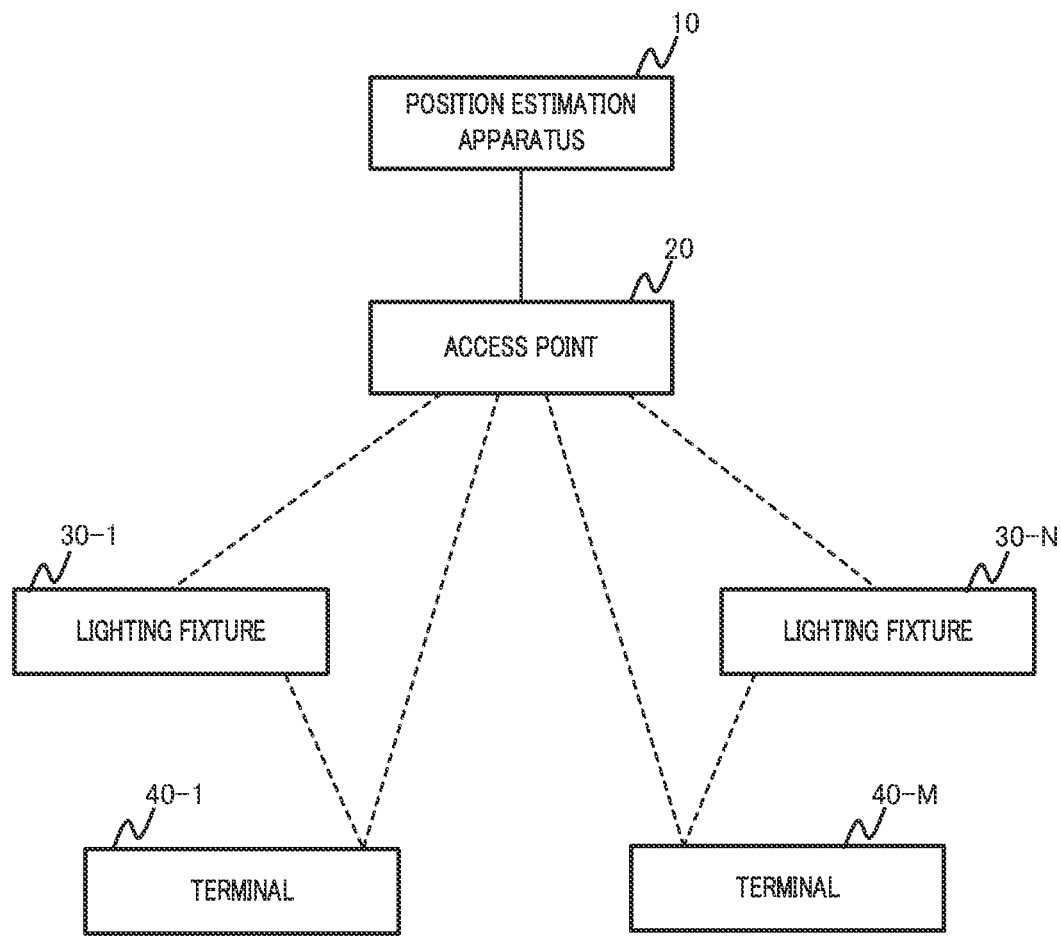
FIG. 1 illustrates a configuration example of a position estimation system according to an embodiment.

FIG. 1 illustrates a configuration example of position estimation system 1. Position estimation system 1 is a system for estimating a position of a terminal. Position estimation system 1 is installed in commercial facilities such as convenience stores or home improvement centers, for example.

Position estimation system 1 includes position estimation apparatus 10, access point 20, a plurality of lighting fixtures 30, and a plurality of terminals 40. Incidentally, when distinguishing among the plurality of lighting fixtures 30, they may be referred to as lighting fixture 30-1, . . . , 30-N(N is an integer of two or more). Moreover, when distinguishing among the plurality of terminals 40, they may be referred to as terminal 40-1, . . . , 40-M (M is an integer of two or more).

Position estimation apparatus 10 is connected to access point 20 via a wired LAN or wireless LAN. Lighting fixture 30 is connected to access point 20 via the wireless LAN. Terminal 40 is connected to access point 20 via the wireless LAN. Thus, position estimation apparatus 10 can transmit and receive data to and from lighting fixture 30 and terminal 40 via access point 20.

Access point 20, lighting fixture 30, and terminal 40 support radio communication using the 920 MHz band. However, the radio communication with the 920 MHz band is merely an example, and radio communication of the present embodiment is not limited to this. For example, access point 20, lighting fixture 30, and terminal 40 may support radio communication using the 2.4 GHz band, the 5 GHz band, and/or the 60 GHz band (Wireless Gigabit (WiGig)).

Each lighting fixture 30 is installed in, for example, a predetermined position of the ceiling in the building. That is, an installation position of each lighting fixture 30 is known. Further, lighting fixture 30 supports the radio communication. For example, via the radio communication, operations such as turning on and off as well as dimming of lighting fixture 30 can be performed from the device at hand (e.g., remote controller). Incidentally, lighting fixture 30 in the present embodiment is an example of electric equipment. That is, in the present embodiment, any electric equipment installed in a predetermined position and capable of receiving a radio signal is acceptable. Examples of the electric equipment include, in addition to lighting fixture 30, air conditioning apparatus (e.g., air conditioner, electric fan), fire alarm, smoke detector, surveillance camera, emergency guidance light, and the like. The term "electric equipment" may be replaced with a "radio electronic device."

Terminal 40 supports the radio communication and is carried by a person in the building (e.g. employee or customer in the commercial facility). An example of terminal 40 includes a smart phone. However, terminal 40 is not limited to the smart phone and may be, for example, a dedicated terminal used by the employee for business. Terminal 40 is also not limited to that carried by the person and may be, for example, provided on a mobile object (e.g., cart or robot) that is movable in the commercial facility. Terminal 40 can be wirelessly connected to access point 20 in the building.

Position estimation apparatus 10 estimates a position of terminal 40 in a region where a plurality of lighting fixtures 30 are installed (hereinafter referred to as a "target region"). For example, position estimation apparatus 10 estimates the position of terminal 40 in the target region based on a received signal strength indicator of a radio signal transmitted from terminal 40, which is measured by a predetermined number of lighting fixtures 30 in the target region, and installation positions of the predetermined number of lighting fixtures 30. An example of position estimation apparatus 10 is a PC or a server. Further details of position estimation apparatus 10 will be described later.

<Position Estimation Apparatus>

Figure 2:
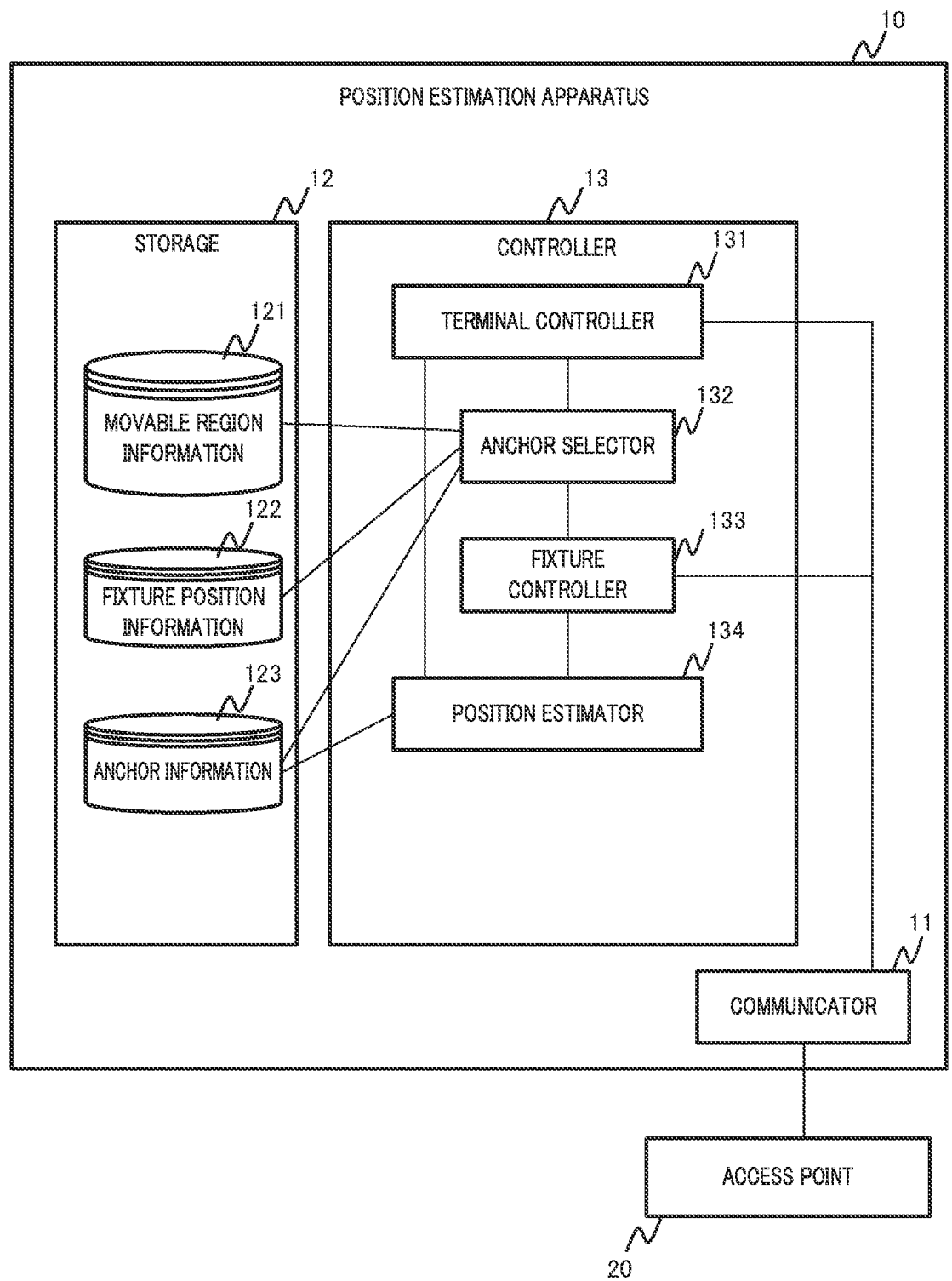
FIG. 2 illustrates a configuration example of a position estimation apparatus according to the embodiment.

FIG. 2 illustrates a configuration example of position estimation apparatus 10. Position estimation apparatus 10 includes communicator 11, storage 12, and controller 13.

Communicator 11 is, for example, a communication interface for the wired LAN or the wireless LAN. Communicator 11 processes transmission and reception of signals to and from lighting fixture 30 and terminal 40 via access point 20.

Storage 12 is, for example, a Hard Disk Drive (HDD), a Solid State Drive (SSD), and/or a flash memory. Storage 12 stores movable region information 121 which is exemplary second information, fixture position information 122 which is exemplary first information, and anchor information 123. Incidentally, movable region information 121, fixture position information 122, and anchor information 123 will be described later in detail (see FIGS. 5, 6, 7).

Controller 13 is, for example, a Central Processing Unit (CPU) or a controller. Controller 13 implements anchor selector 132, fixture controller 133, and position estimator 134 as functions of position estimation apparatus 10. These functions may be implemented by controller 13 executing a computer program.

Terminal controller 131 controls communication with terminal 40 via communicator 11 and access point 20.

Anchor selector 132 selects, as an anchor, lighting fixture 30 used for the position estimation for terminal 40 from among a plurality of lighting fixtures 30 in the target region. For example, anchor selector 132 selects the anchor based on movable region information 121 and fixture position information 122 and stores a selection result as anchor information 123 in storage 12. Further details of anchor selection will be described later (see FIG. 11).

Fixture controller 133 controls communication with lighting fixture 30 via communicator 11 and access point 20.

Position estimator 134 instructs the anchor to measure of third information (e.g., received signal strength indicator (RSSI)) related to radio communication quality of the radio signal transmitted from terminal 40. Position estimator 134 estimates the position of terminal 40 based on the third information related to the radio communication quality of the radio signal measured by the anchor and a position of the anchor. Further details of position estimation for terminal 40 will be described later (see FIG. 12). Incidentally, position estimator 134 outputs an estimation result to a surveillance device (not illustrated) in order to use the result for optimizing a personnel arrangement and the number of employees in a case where terminal 40 is carried by the employee. Further, the surveillance device may know, from the estimation result, a traffic line of terminal 40 and use it for changing a store layout.

<Lighting Fixture>

Figure 3:
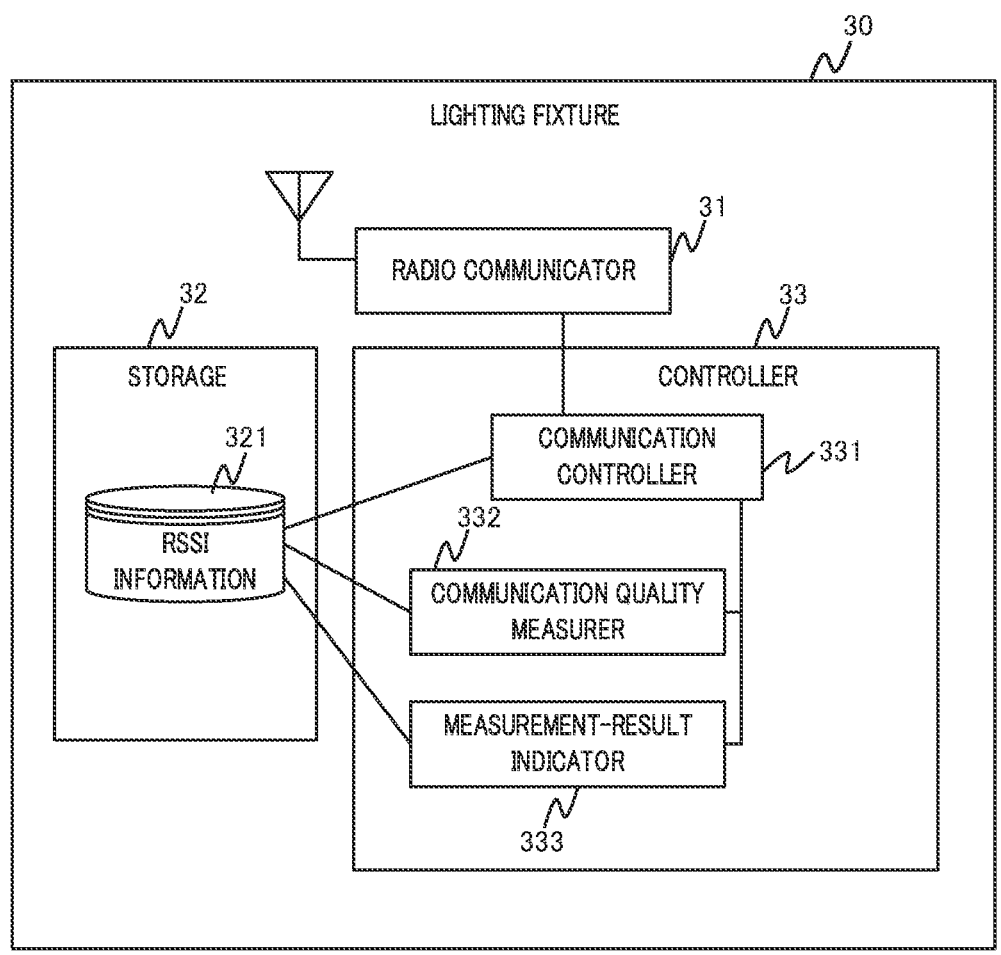
FIG. 3 illustrates a configuration example of a lighting fixture according to the embodiment.

FIG. 3 illustrates a configuration example of lighting fixture 30. Lighting fixture 30 includes radio communicator 31, storage 32, and controller 33.

Radio communicator 31 is, for example, a communication interface for the wireless LAN. Radio communicator 31 transmits and receives radio signals to and from position estimation apparatus 10 via access point 20. Radio communicator 31 also receives a radio signal transmitted from terminal 40.

Storage 32 is, for example, a flash memory. Storage 32 stores RSSI information 321. Further details of RSSI information 321 will be described later (see FIG. 8).

Controller 33 is, for example, a CPU or a controller. Controller 33 implements communication controller 331, communication quality measurer 332, and measurement-result indicator 333 as functions of lighting fixture 30. These functions may be implemented by controller 33 executing a computer program.

Communication controller 331 controls transmission and reception of radio signals to and from position estimation apparatus 10 via radio communicator 31 and access point 20. Communication controller 331 also controls reception of a radio signal transmitted from terminal 40 via radio communicator 31.

Communication quality measurer 332 measures the received signal strength indicator (e.g., RSSI) as one of pieces of the communication quality of the radio signal transmitted from terminal 40. Communication quality measurer 332 stores a measured received signal strength indicator as RSSI information 321 in storage 32.

Measurement-result indicator 333 transmits RSSI information 321 in storage 32 to position estimation apparatus 10 via radio communicator 31 and access point 20.

<Terminal>

Figure 4:
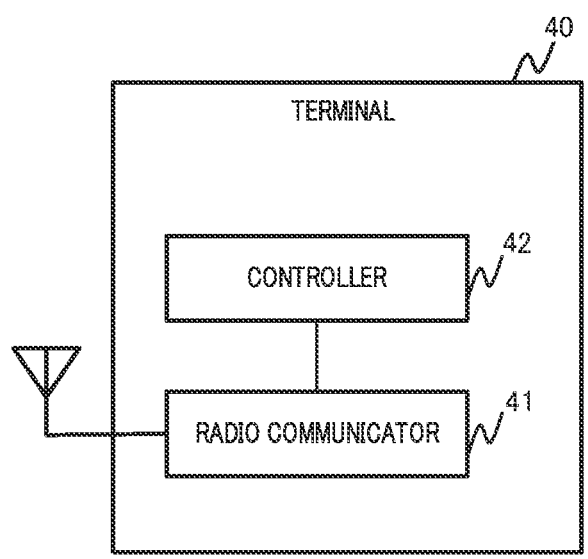
FIG. 4 illustrates a configuration example of a terminal according to the embodiment.

FIG. 4 illustrates a configuration example of terminal 40. Terminal 40 includes radio communicator 41 and controller 42.

Radio communicator 41 is, for example, a communication interface for the wireless LAN. Radio communicator 41 transmits and receives radio signals to and from position estimation apparatus 10 via access point 20.

Controller 42 is, for example, a CPU or a controller. When receiving an acknowledgment request (e.g., Keep-Alive request) from position estimation apparatus 10 via radio communicator 41, controller 42 transmits an acknowledgment response corresponding to the acknowledgment request via radio communicator 41. Lighting fixture 30 selected as the anchor receives (e.g., intercepts) a radio signal of this acknowledgment response and measures the received signal strength indicator.

<Movable Region Information>

FIG. 5 illustrates an example of movable region information 121. Movable region information 121 is information indicating, for each type of terminal 40, a region within which terminal 40 can move in the target region.

For example, movable region information 121 associates terminal type 601, terminal identifier 602, and movable region 603 with each other.

Terminal type 601 is information indicating the type of terminal 40.

Terminal identifier 602 is informational uniquely identifying terminal 40.

Movable region 603 is information indicating a region within which terminal 40 of terminal type 601 can move in the target region.

The example in FIG. 5 illustrates the following:

Terminal type 601 of terminal 40 with terminal identifier 602 of "40-2" is an "employee" (i.e. the terminal carried by the employee), and movable region 603 of terminal 40 is a rectangular region formed by the point (X0, Y0) at an upper left corner and the point (X1, Y2) at a lower right corner.

Terminal type 601 of terminal 40 with terminal identifier 602 of "40-1" is a "customer" (i.e. the terminal carried by the customer), and movable region 603 of terminal 40 is a rectangular region formed by the point (X0, Y0) at the upper left corner and the point (X1, Y1) at the lower right corner.

Incidentally, when a plurality of terminal types 601 of the same kind is present in the same movable region, a plurality of terminal identifiers 602 is described. Meanwhile, when each of the plurality of terminal types 601 of the same kind is present in different movable regions 603, it is described as different information.

<Fixture Position Information>

Figure 6:
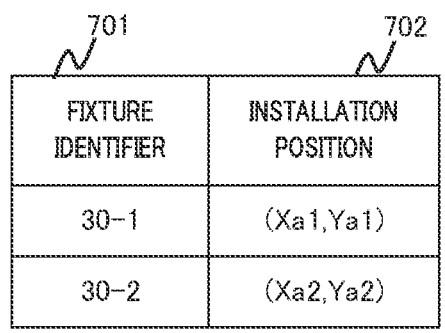
FIG. 6 illustrates an example of fixture position information according to the embodiment.

FIG. 6 illustrates an example of fixture position information 122. Fixture position information 122 is information indicating a position in which lighting fixture 30 is actually installed in the target region.

For example, fixture position information 122 associates fixture identifier 701 and installation position 702.

Fixture identifier 701 is information for uniquely identifying lighting fixture 30.

Installation position 702 is information indicating the position in which lighting fixture 30 having a fixture identifier is actually installed (e.g., coordinates).

The example in FIG. 6 illustrates the following:

Installation position 702 of lighting fixture 30 with fixture identifier 701 of "30-1" is (Xa1, Ya1).

Installation position 702 of lighting fixture 30 with fixture identifier 701 of "30-2" is (Xa2, Ya2).

<Anchor Information>

FIG. 7 illustrates an example of anchor information 123. Anchor information 123 is information indicating lighting fixtures 30 selected as the anchors for the position estimation for terminals 40 in the target region.

For example, anchor information 123 associates terminal identifier 801 and the identifiers of lighting fixtures 30 selected as the anchors (hereinafter referred to as "anchor identifier 802").

The example in FIG. 7 illustrates the following:

Anchor identifiers 802 of lighting fixtures 30 (i.e., anchors) selected for the position estimation for terminal 40 with terminal identifier 801 of "40-1" are, "30-$x$1," "30-$x$2," "30-$x$3," "30-$x$4," "30-$x$5," and "30-$x$6."

Anchor identifiers 802 of lighting fixtures 30 (i.e., anchors) selected for the position estimation for terminal 40 with terminal identifier 801 of "40-2" are, "30-$y$1," "30-$y$2," "30-$y$3," "30-$y$4," "30-$y$5," and "30-$y$6."

<RSSI Information>

Figure 8:
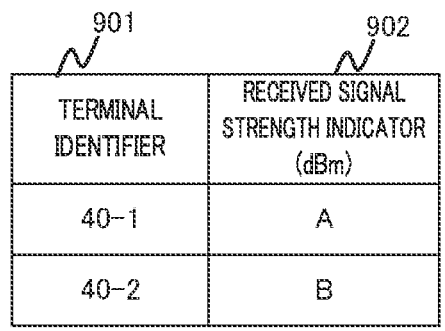
FIG. 8 illustrates an example of Received Signal Strength Indicator (RSSI) information according to the embodiment.

FIG. 8 illustrates an example of RSSI information 321. RSSI information 321 is information indicating the received signal strength indicator of the radio signal transmitted from terminal 40, which is measured by lighting fixture 30.

For example, RSSI information 321 associates terminal identifier 901 and received signal strength indicator 902.

The example in FIG. 8 illustrates the following. Incidentally, the information in FIG. 8 is stored for each anchor (each lighting fixture 30) and may be transmitted with the anchor identifier of the transmission source when being transmitted to position estimation apparatus 10.

Received signal strength indicator 902 for the radio signal transmitted from terminal 40 with terminal identifier 901 of "40-1" and received by the anchor is "A (dBm)."

Received signal strength indicator 902 for the radio signal transmitted from terminal 40 with terminal identifier 901 of "40-2" and received by the anchor is "B (dBm)."

<Processing of Lighting Fixture>

Figure 9:
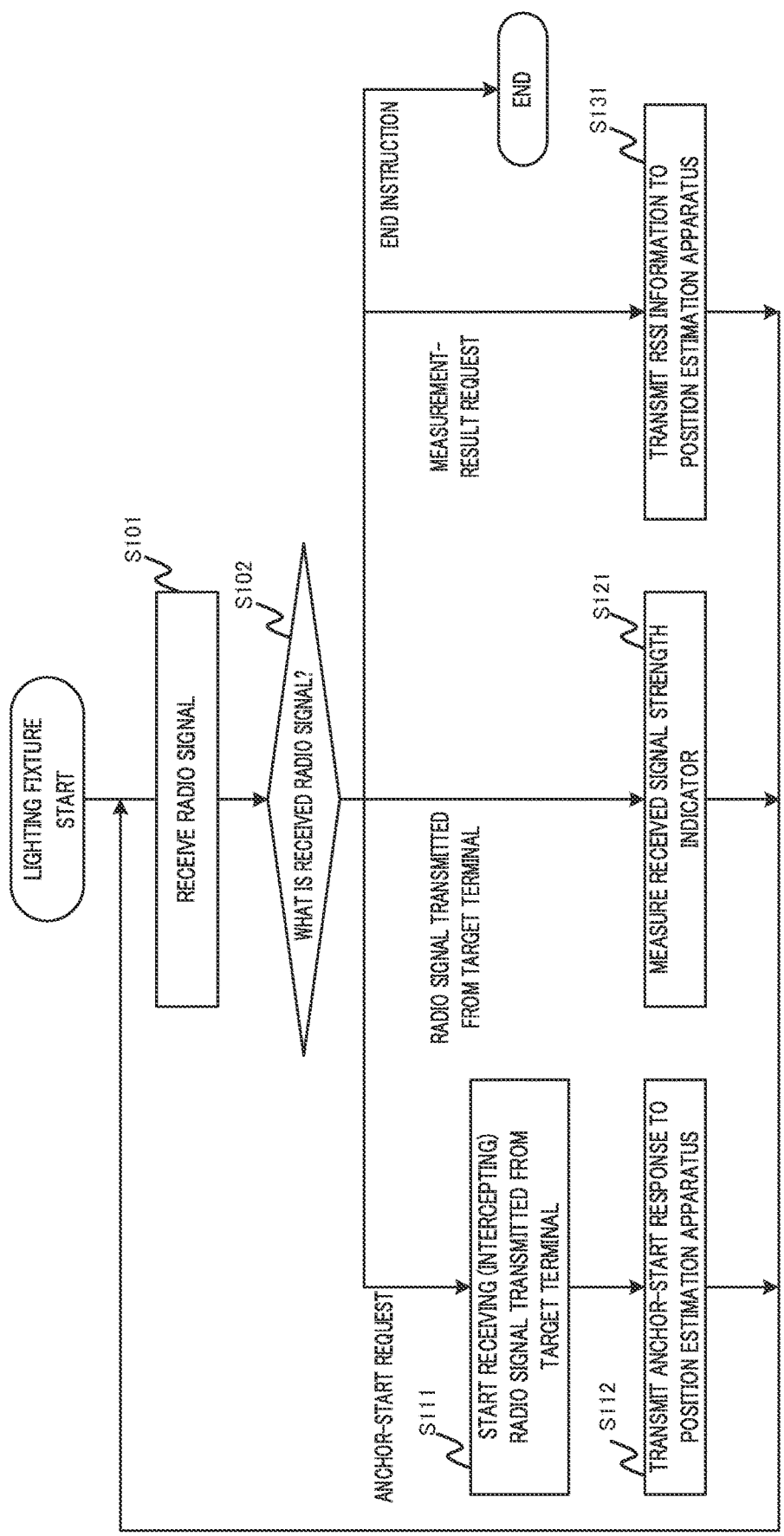
FIG. 9 is a flowchart illustrating exemplary processing of the lighting fixture according to the embodiment.

Next, with reference to a flowchart illustrated in FIG. 9, exemplary processing of lighting fixture 30 will be described.

Communication controller 331 receives a radio signal via radio communicator 31 (S101).

Communication controller 331 determines whether the radio signal received in S101 corresponds to any one of an anchor-start request transmitted from position estimation apparatus 10, a radio signal transmitted from terminal 40 that is a target for position estimation, a measurement-result request transmitted from position estimation apparatus 10, and an end instruction transmitted from position estimation apparatus 10 (S102).

In a case where the radio signal received in S101 is an anchor-start request transmitted from position estimation apparatus 10 (S102: anchor-start request), communication controller 331 start receiving (e.g., intercepting) the radio signal transmitted from terminal 40 that is the target for position estimation (S111). Terminal 40 that is the target for position estimation to be intercepted may be indicated (identified) for communication controller 331 based on the information included in the anchor-start request (e.g., terminal identifier). Communication controller 331 then transmits an anchor-start response to position estimation apparatus 10 (S112) and returns to the process in S101.

In a case where the radio signal received in S101 is a radio signal transmitted from terminal 40 of interest (hereinafter may be referred to as "target terminal 40") (S102: radio signal transmitted from target terminal), communication controller 331 measures a received signal strength indicator of the radio signal and stores, in storage 32, a measurement result as RSSI information 321 (S121). Then, communication controller 331 returns to the process in S101.

In a case where the radio signal received in S101 is a measurement-result request transmitted from position estimation apparatus 10 (S102: measurement-result request), communication controller 331 transmits RSSI information 321 in storage 32 to position estimation apparatus 10 (S131). Then, controller 33 returns to the process in S101.

In a case where the radio signal received in S101 is an end instruction transmitted from position estimation apparatus 10 (S102: end instruction), communication controller 331 ends this processing.

In the manner described above, lighting fixture 30 that has received the anchor-start request measures the received signal strength indicator of the radio signal transmitted by terminal 40 that is the target for position estimation and transmits the measurement result to position estimation apparatus 10, as an anchor of target terminal 40.

<Processing of Position Estimation Apparatus>

Next, with reference to a flowchart illustrated in FIG. 10, exemplary processing of position estimation apparatus 10 will be described.

For example, when entering the target region, terminal 40 transmits a connection request to access point 20. Terminal controller 131 receives the connection request from terminal 40 via access point 20 (S201).

Anchor selector 132 performs anchor-selection process (S202). Further details of the anchor-selection process will be described later (see FIG. 11).

Fixture controller 133 transmits, via access point 20, an anchor-start request to lighting fixture(s) 30 selected as the anchor(s) in S202 (S203). Processing of lighting fixture 30 that has received the anchor-start request is as described in FIG. 9.

Fixture controller 133 receives an anchor-start response from lighting fixture 30 that is a transmission destination of the anchor-start request via access point 20 (S204).

Fixture controller 133 determines whether the anchor start responses have been received from all of lighting fixtures 30 that are the transmission destinations of the anchor start request (S205).

When not receiving the anchor start response from at least one lighting fixture 30 of lighting fixtures 30 that are the transmission destinations of the anchor start request (S205: NO), controller 13 returns to the process in S204.

When receiving the anchor start responses from all of lighting fixtures 30 that are the transmission destinations of the anchor start request (S205: YES), position estimator 134 performs a position-estimation process for target terminal 40 (S206). Further details of the position-estimation process will be described later (see FIG. 12). Controller 13 then repeats the process in S206 for target terminal 40.

Figure 10:
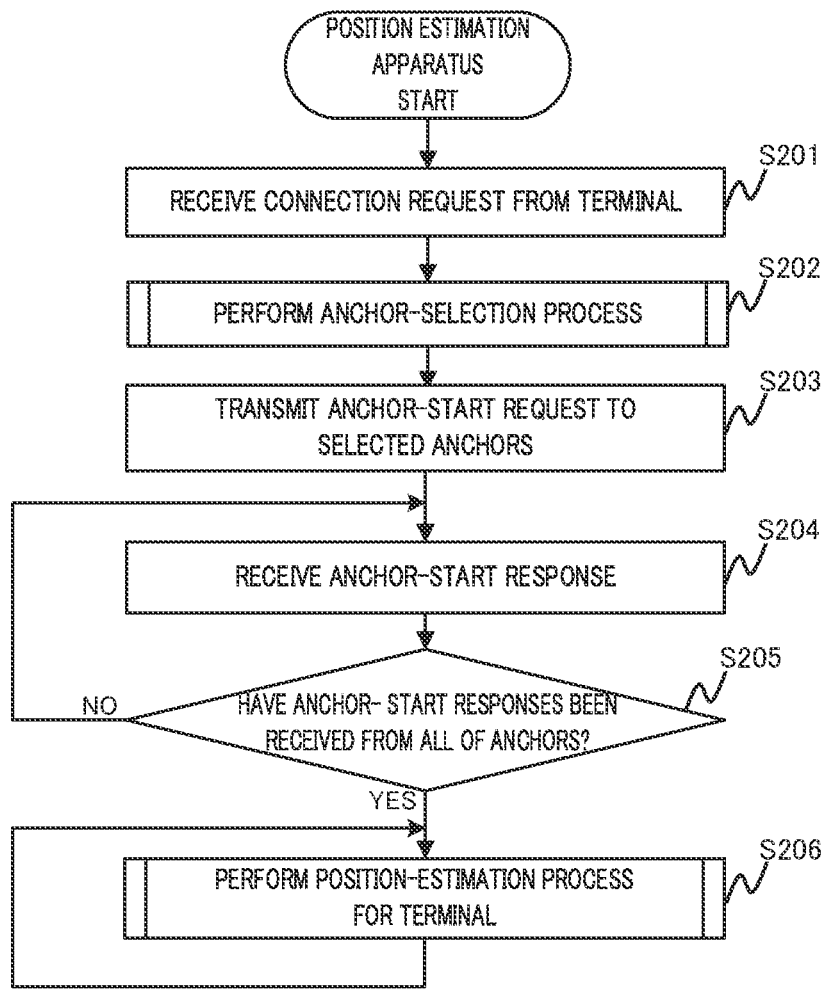
FIG. 10 is a flowchart illustrating exemplary processing of the position estimation apparatus according to the embodiment.

The processes illustrated in FIG. 10 are performed each time a connection request is received from terminal 40 which is new. That is, position estimation apparatus 10 performs the processes in S201 to S205 to select an anchor for the position estimation for terminal 40 which is new (target terminal 40), repeats the process in S206, using the selected anchor, and thereby estimates the position of target terminal 40 at any time.

<Anchor-Selection Process>

Next, with reference to a flowchart illustrated in FIG. 11, an exemplary anchor-selection process will be described. This process corresponds to the process in S202 in FIG. 10.

Anchor selector 132 refers to movable region information 121 and identifies terminal type 601 and movable region 603 associated with terminal identifier 602 of terminal 40 that has transmitted the connection request (S301). Incidentally, terminal identifier 602 of terminal 40 may be included in the connection request.

Anchor selector 132 selects lighting fixture(s) 30 present in the movable region identified in S301 as anchor candidate(s) for the position estimation for terminal 40 that has transmitted the connection request (that is, the target terminal of the position estimation) (S302).

Anchor selector 132 determines whether the number of anchor candidates is equal to or greater than anchor-selection number α (S303). Anchor-selection number α may be a predetermined number and may be determined based on, for example, the size of the movable region or a required position-estimation accuracy. Note that, the number of anchor candidates is the same as the number of lighting fixtures 30 in the movable region.

In a case where the number of anchor candidates is less than anchor-selection number α (S303: NO), anchor selector 132 selects all of the anchor candidates as anchors (S304). Then, the anchor-selection process is completed.

When the number of anchor candidates is equal to or greater than anchor selection number α (S303: YES), anchor selector 132 performs the following process in S305.

Anchor selector 132 divides the movable region identified in S301 into, for example, L regions (L is an integer of two or more) (hereinafter each referred to as "divided region") (S305). This makes it possible to distribute the positions of the anchors. Incidentally, anchor selector 132 may divide the movable region into divided regions each having the same area.

Anchor selector 132 identifies the number Ji of lighting fixtures 30 present in each divided region (S306). Incidentally, "Ji" represents the number of lighting fixtures 30 present in divided region i (i is an integer from two to L (both inclusive)).

Anchor selector 132 determines whether a divided region where the number Ji of lighting fixtures 30 is less than α/L is present (S307).

In a case where a divided region where the number Ji of lighting fixtures 30 is less than α/L is not present (S307: NO), anchor selector 132 selects α/L lighting fixtures 30 as the anchors in each division region (S311). Then, the anchor-selection process is completed.

In a case where a divided region where the number Ji of lighting fixtures 30 is less than α/L is present (S307: YES), anchor selector 132 performs the following process in S308.

Anchor selector 132 calculates the number of lacking anchors (α/L−Ji) for each divided region where the number Ji of lighting fixtures 30 is less than α/L (hereinafter referred to as "lacking divided region") i (S308).

Anchor selector 132 selects all of lighting fixtures 30 as the anchors in the lacking divided region (S309).

In any of divided regions where the number of lighting fixtures 30 is α/L or more, anchor selector 132 selects (α/L−Ji) lighting fixtures 30 as the anchors, in addition to α/L lighting fixtures 30 (S310). Then, the anchor-selection process is completed.

In the manner described above, performing the processes in S308 to S310 makes it possible to select lighting fixtures 30 with anchor-selection number α as the anchors in the movable region even when there is a variation in the number of lighting fixtures 30 for each divided region. Thus, unevenness in arrangement of the anchors for each divided region can be reduced.

Figure 11:
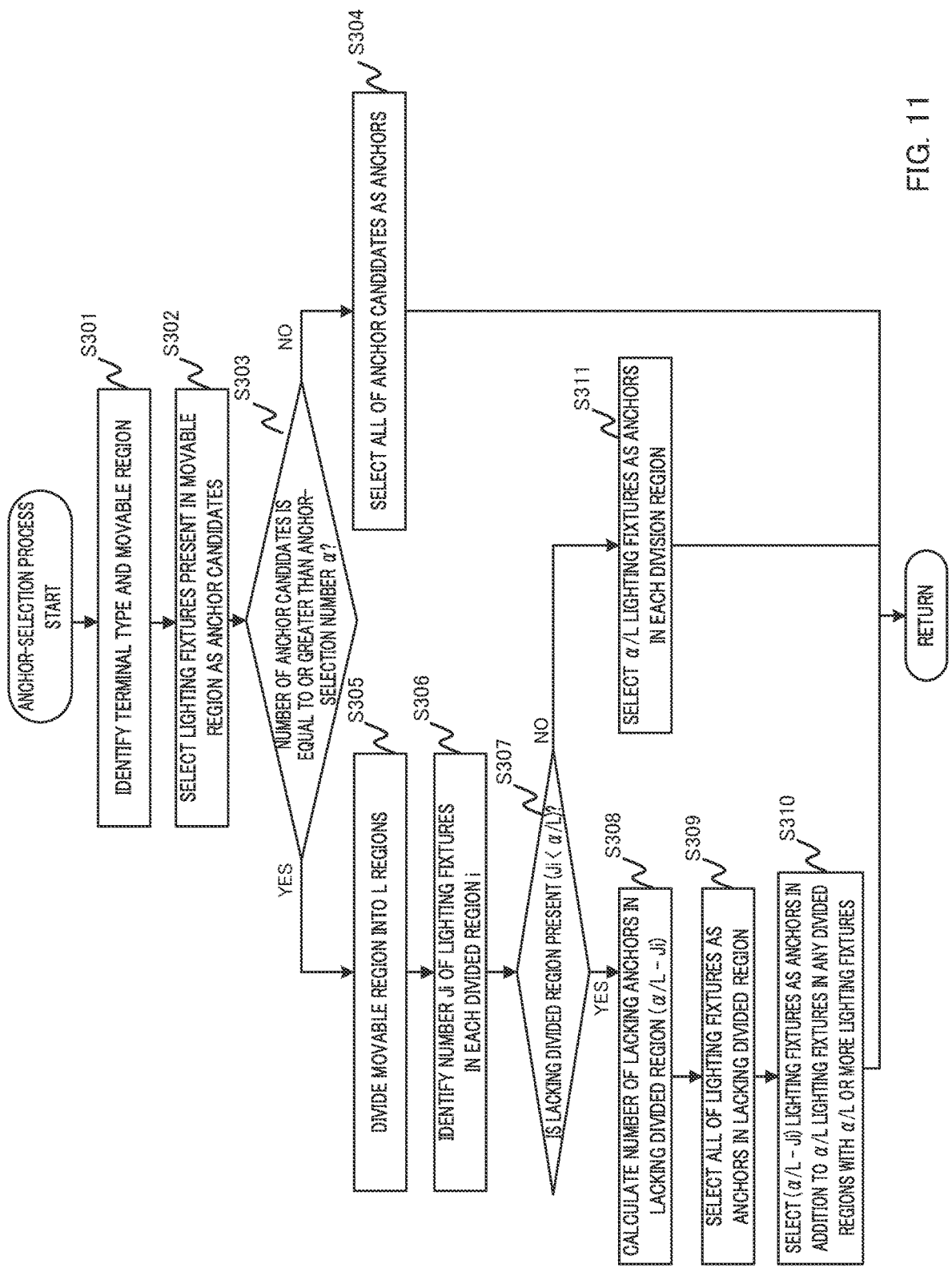
FIG. 11 is a flowchart illustrating an exemplary anchor-selection process according to the embodiment.

In FIG. 11, in a case where, in S304, the number β of lighting fixtures 30 present in the movable region of target terminal 40 is less than anchor-selection number α, anchor selector 132 selects all of lighting fixtures 30 (i.e. β lighting fixtures 30) as the anchors. However, the present embodiment is not limited to this. For example, anchor selector 132 may select (β−α) lighting fixtures 30 present outside the movable region of target terminal 40 as the anchors in addition to lighting fixtures 30 present in the movable region of target terminal 40. Thus, since a lighting fixtures 30 are selected as the anchors, the position-estimation accuracy for target terminal 40 can be improved as compared when β lighting fixtures 30 are selected as the anchors.

<Position-Estimation Process>

Figure 12:
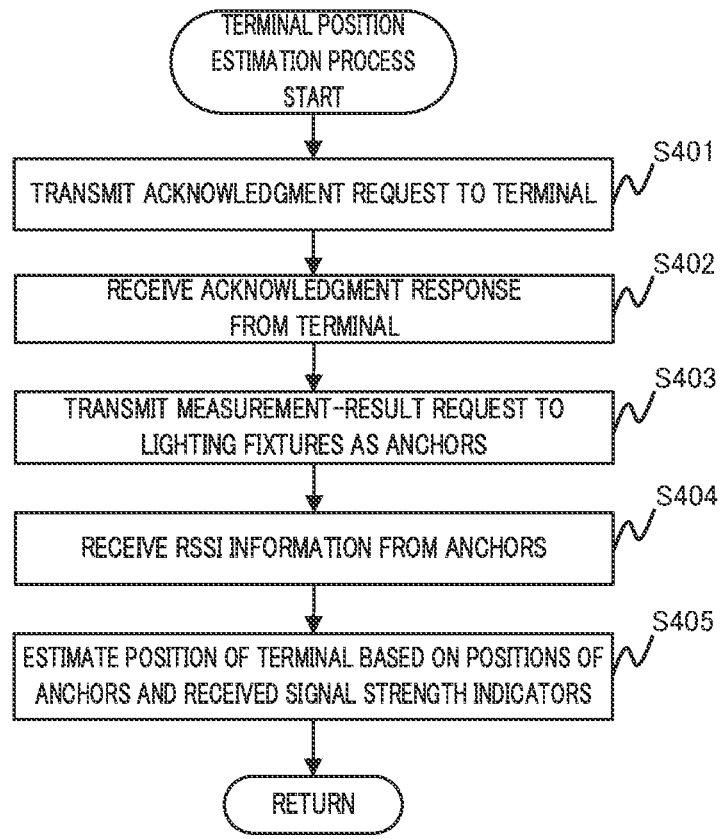
FIG. 12 is a flowchart illustrating an exemplary position-estimation process according to the embodiment.

Next, with reference to a flowchart illustrated in FIG. 12, an exemplary position-estimation process will be described. This process corresponds to the process in S206 in FIG. 10.

Position estimator 134 transmits an acknowledgment request to target terminal 40 via access point 20 (S401). An example of the acknowledgment request is a Keep-Alive signal for confirming that target terminal 40 is alive. Target terminal 40 that has received the acknowledgment request transmits a radio signal serving as an acknowledgment response. Lighting fixture(s) 30 selected as the anchor(s) receives (e.g., intercepts) the radio signal of this acknowledgment response.

Position estimator 134 receives the acknowledgment response transmitted from target terminal 40 via access point 20 (S402).

Position estimator 134 transmits a measurement-result request to lighting fixtures 30 selected as the anchors of target terminal 40 (S403). As illustrated in FIG. 9, lighting fixtures 30 that have received the measurement-result request transmit RSSI information 321 to position estimation apparatus 10.

Position estimator 134 receives RSSI information 321 from lighting fixtures 30 selected as the anchors of target terminal 40 (S404).

Position estimator 134 estimates the position of terminal 40 based on the installation position of each of lighting fixtures 30 selected as the anchors of target terminal 40 and RSSI information 321 received from each of lighting fixtures 30 in S404 (S405). For example, position estimator 134 calculates distances from the respective installation positions of at least three lighting fixtures 30 selected as the anchors to target terminal 40, using the received signal strength indicators, and thereby estimates the position of target terminal 40, using trilateration. Then, the position-estimation process is completed.

In the manner described above, position estimation apparatus 10 estimates the position of target terminal 40 based on the installation positions of a plurality of lighting fixtures 30 selected as the anchors and the received signal strength indicators of the radio signal transmitted by target terminal 40, which is measured by the plurality of lighting fixtures 30.

<Exemplary Anchor Selection>

Figure 13:
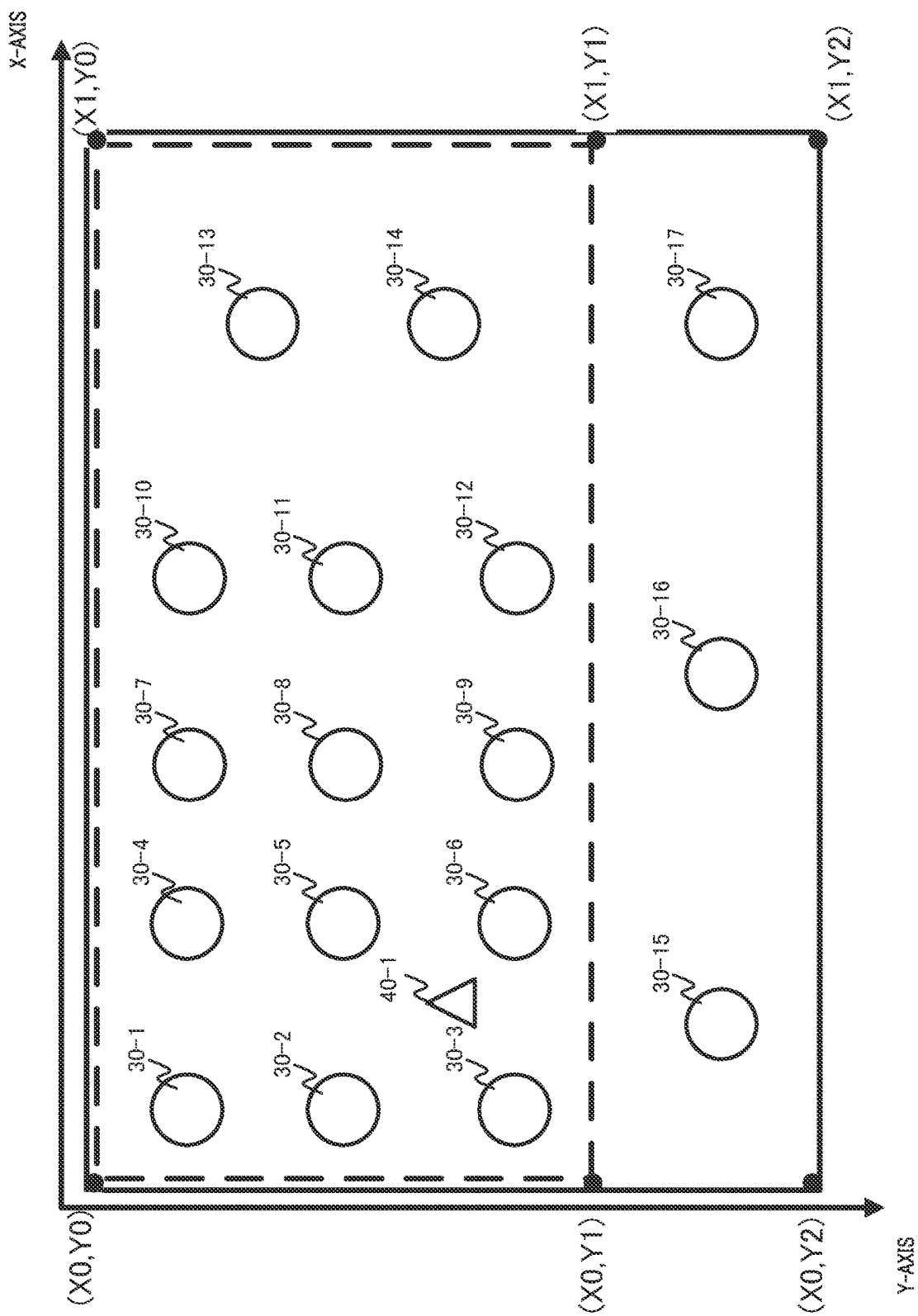
FIG. 13 is a diagram for describing the first example of anchor selection according to the embodiment.
Figure 14:
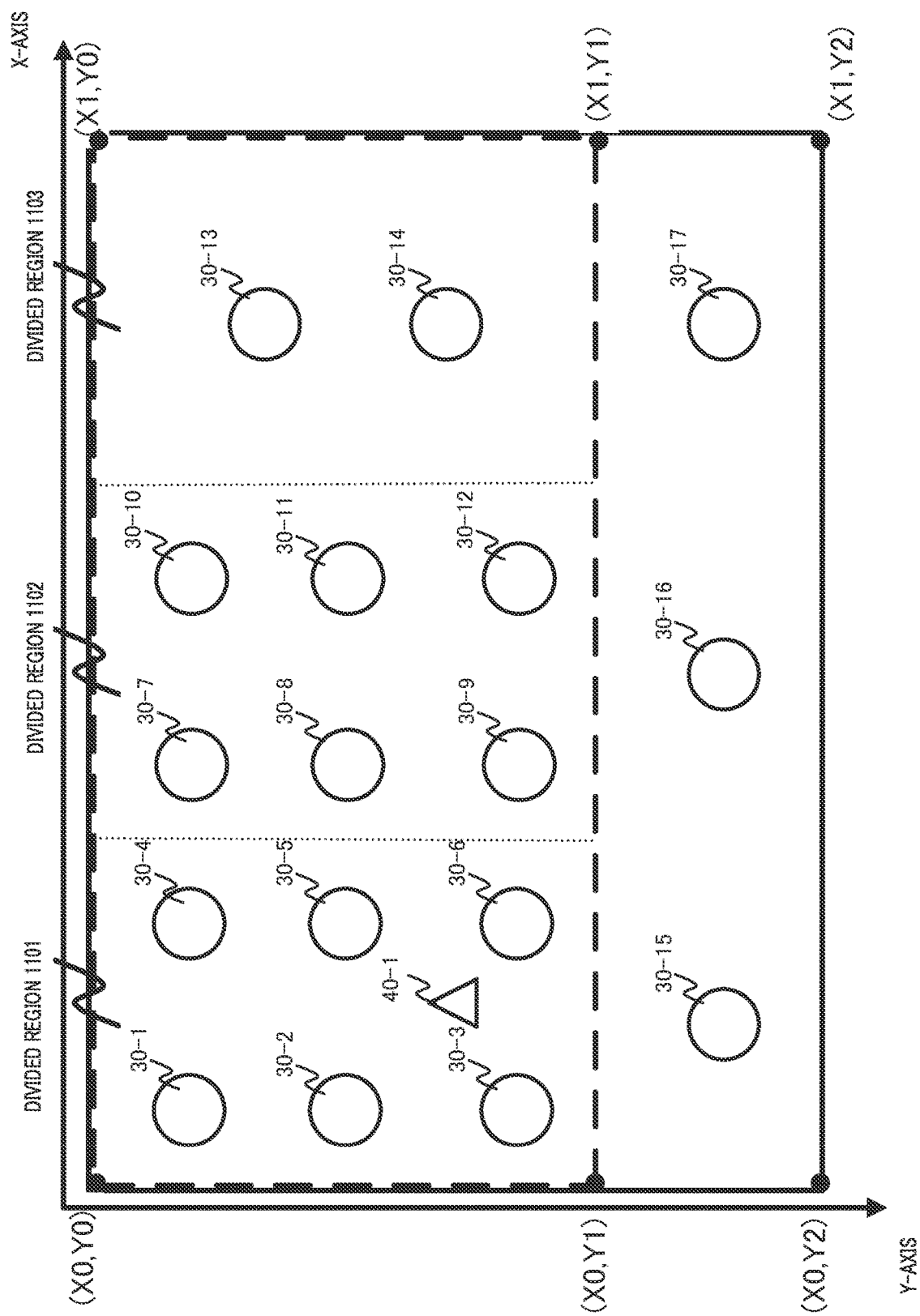
FIG. 14 is a diagram for describing the second example of the anchor selection according to the embodiment.
Figure 15:
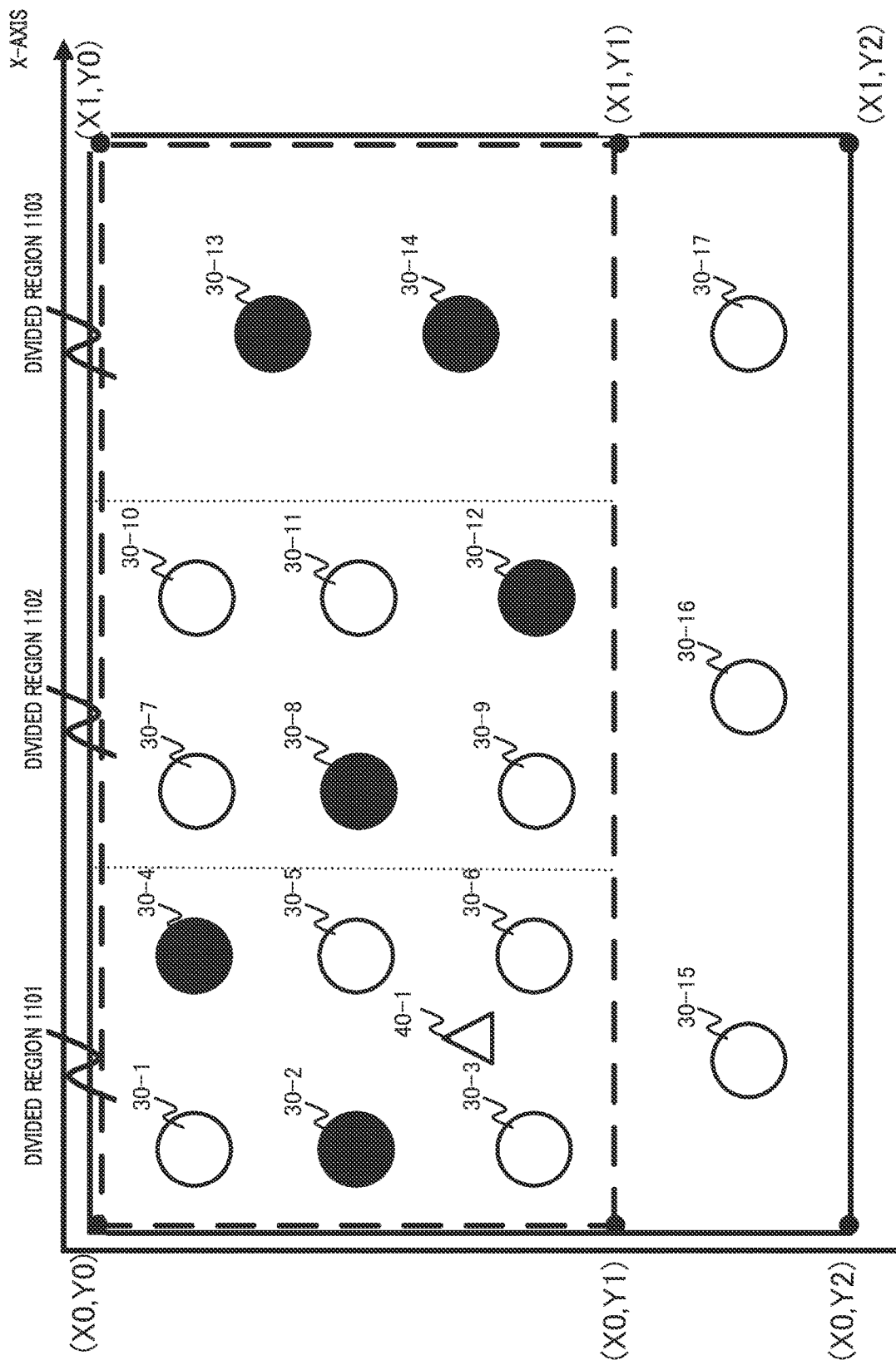
FIG. 15 is a diagram for describing the third example of the anchor selection according to the embodiment.

Exemplary anchor selection will be described with reference to FIGS. 13, 14 and 15. FIGS. 13, 14 and 15 illustrate an example in which a plurality of lighting fixtures 30-1, . . . , 30-17 are installed on the ceiling of a commercial facility such as a convenience store or home improvement center. In FIGS. 13, 14 and 15, a position is expressed by two-dimensional coordinates consisting of an X-axis and a Y-axis. However, expression of the position according to the present embodiment is not limited to these two-dimensional coordinates.

In FIGS. 13, 14 and 15, a dashed-line rectangular region having vertices of point (X0, Y0), point (X1, Y0), point (X1, Y1), and point (X0, Y1) indicates a movable region within which a customer in the commercial facility can move, that is, the movable region of terminal 40 of the terminal type "customer" (hereinafter referred to as "customer terminal").

In FIGS. 13, 14, and 15, a solid-line rectangular region having vertices of point (X0, Y0), point (X1, Y0), point (X1, Y2), and point (X0, Y2) indicates a movable region within which an employee in the commercial facility can move, that is, the movable region of terminal 40 of the terminal type "employee" (hereinafter referred to as "employee terminal").

The movable region of the customer terminal is, for example, a sales floor. The movable region of the employee terminal is, for example, the sales floor and a backyard for storing goods.

In S301 in FIG. 11, anchor selector 132 identifies whether the terminal type is any of "employee" and "customer," and, in a case of terminal type "employee," sets the solid-line rectangular region as the movable region of the employee terminal, and, in a case of terminal type "customer," sets the dashed-line rectangular region as the movable region of the customer terminal.

That is, in a case of the customer terminal, lighting fixtures 30-15, 30-16, and 30-17 present outside the dashed-line rectangular region are excluded from the anchor candidates. This prevents lighting fixture 30 present in a region where terminal 40 cannot move from being selected for the anchor.

Next, with reference to FIGS. 14 and 15, a description will be given of an exemplary process of dividing the movable region of the customer terminal into three divided regions (L=3) when anchor-selection number α is six.

As illustrated in FIG. 14, in S305 in FIG. 11, anchor selector 132 divides the movable region of the customer terminal into three divided regions 1101, 1102, and 1103 each having the same area. Consequently, divided region 1101 includes six lighting fixtures 30, divided region 1102 includes six lighting fixtures 30, and divided region 1103 includes two lighting fixtures 30.

In this case, since α/L is 6/3=2, anchor selector 132 selects two lighting fixtures 30 as the anchors in each of divided regions 1101, 1102, and 1103.

For example, as illustrated in FIG. 15, anchor selector 132 selects lighting fixtures 30-2 and 30-4 as the anchors in divided region 1101, selects lighting fixtures 30-8 and 30-12 as the anchors in divided region 1102, and selects lighting fixtures 30-13 and 30-14 as the anchors in divided region 1103 (see lighting fixtures 30 of black circles). Incidentally, anchor selector 132 may select the anchors at random in each divided region.

In the present embodiment, the anchors are selected for each terminal 40 as illustrated in FIG. 7. Thus, selecting the anchor for each terminal 40 and each division region makes it possible to prevent lighting fixtures 30 selected as the anchors from being unevenly distributed.

In the above, a description has been given with a case including two terminal types of "employee" and "customer;" but the present embodiment is not limited to this. For example, when each employee has a different movable region, that is, when terminal 40 carried by each employee has a different movable region, movable region information 121 may associate a movable region for each terminal identifier of terminal 40 carried by each employee.

As described above, according to the present embodiment, lighting fixtures 30 to be anchor candidates are selected based on the movable region for each terminal 40, and from among the anchor candidates, lighting fixtures 30 with anchor-selection number α can be selected as the anchors. Thus, a process related to terminal 40 outside the movable region is reduced in the process flow in FIGS. 9 to 12; as a result, it is possible to ensure the accuracy of the position estimation for terminal 40 in the movable region and to shorten the time required for the position estimation for terminal 40 in the movable region.

For example, in a case of estimating the position of terminal 40 carried by a customer in a building such as a home improvement center in which the region of the backyard where the customer does not move is large with respect to the region of the sales floor where the customer moves, the following advantages are obtainable according to the present embodiment. That is, lighting fixtures 30 present in the region of the backyard where the customer does not move are not selected as the anchors for the position estimation for customer terminal 40, the time required for position estimation for customer terminal 40 can be shortened. Meanwhile, lighting fixtures 30 in the region of the backyard where the employee moves may be selected as the anchors for position estimation for employee terminal 40, and thus the accuracy of the position estimation for employee terminal 40 can be ensured. Further, since the time required for the position estimation can be shortened, it is possible to reduce the difference between a position indicated by the position-estimation process and an actual position even with the mobile terminal.

SUMMARY OF PRESENT DISCLOSURE

Position estimation apparatus 10 according to the present disclosure includes: a selection circuit (e.g., anchor selector 132) that selects at least one radio electronic device (e.g., lighting fixture 30) as an anchor used for estimating a position of a mobile terminal (e.g., terminal 40), based on first information (e.g., fixture position information 122) and second information (e.g., movable region information 121), the first information being related to an arrangement in a first region in which at least one of radio electronic devices including the at least one radio electronic device is arranged, the second information being related to a second region within which the mobile terminal is movable in the first region; and an estimation circuit (e.g., position estimator 134) that estimates a position of the mobile terminal based on third information (e.g., RSSI information 321) related to radio communication quality between the anchor and the mobile terminal and on information related to the anchor in the first information.

According to this configuration, since the anchor is selected from among radio electronic devices installed in the movable region of the mobile terminal, it is possible to omit the process flow used for the position estimation with respect to the radio electronic devices installed outside the movable region. Thus, as compared when selecting all of the radio electronic devices as the anchors, the time required for the position estimation can be further shortened.

The second information may be associated with the type of the mobile terminal. The selection circuit may identify the type of the mobile terminal and use the second information associated with the type of the identified mobile terminal.

According to this configuration, since a predetermined number of anchors are selected from among the radio electronic devices installed in the movable region corresponding to the type of mobile terminal, as compared when selecting all of the radio electronic devices as the anchor, the information related to the position-estimation process that increases in proportion to the number of anchors is reduced, and thus, the time required for the position estimation can be further shortened, and the accuracy of position estimation can be ensured.

When the number of radio electronic devices installed in the second area is greater than the predetermined number of anchors (e.g., anchor-selection number α), the selection circuit may divide the second region into a plurality of division regions and select, in each of the divided regions, the anchor from among the radio electronic devices installed in the divided region.

According to this configuration, since the anchor is selected for each divided region, it is possible to prevent the anchor is unevenly distributed.

The estimation circuit may periodically transmit the acknowledgement request to the mobile terminal. The radio signal, which is the measurement target of the radio communication quality, transmitted from the mobile terminal to the anchor may be an acknowledgment response transmitted from the mobile terminal in response to the reception of the acknowledgment request.

According to this configuration, the radio electronic device can measure the radio communication quality of the of radio signals periodically transmitted from the mobile terminal, so that position estimation apparatus 10 can periodically estimate the position of the mobile terminal. Thus, position estimation apparatus 10 can trace the movement of the mobile terminal.

The selection circuit may instruct the selected anchor to start measuring the radio communication quality of the radio signal transmitted from the mobile terminal to the anchor.

According to this configuration, since the radio electronic device measures the radio communication quality of the radio signal transmitted from the identified mobile terminal, the process burden of the radio electronic device is reduced as compared when measuring the radio communication quality of all of the mobile terminals. In addition, it is possible to reduce the communication traffic that occurs when position estimation apparatus 10 receives the measurement result of the radio communication quality from each lighting fixture 30.

The radio electronic device may be a lighting fixture operable by a radio signal. The radio communication quality may be a received signal strength indicator (e.g., RSSI) of the radio signal transmitted from the mobile terminal.

Although various embodiments have been described above with reference to the drawings, it goes without saying that the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

The present disclosure can be realized by software, hardware, or software in cooperation with hardware.

In the description described above, " . . . er (or)" and "section" used for each component may be replaced with other terms such as " . . . circuit (circuitry)," " . . . device," " . . . unit," and " . . . module."

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g., digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)."

The communication may include exchanging data through, for example, a cellular system, a radio base station backhaul line a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The disclosure of Japanese Patent Application No. 2019-143111, filed on Aug. 2, 2019 including the specification, drawings and abstract, are incorporated herein by reference in its entirety.

INDUSTRIAL APPLICABILITY

The present disclosure is useful for estimating positions of mobile terminals, for example.

REFERENCE SIGNS LIST

1 Position estimation system
10 Position estimation apparatus
11 Communicator
12 Storage
13 Controller
20 Access point
30 Lighting fixture
31 Radio communicator
32 Storage
33 Controller
40 Terminal
41 Radio communicator
42 Controller
121 Movable region information
122 Fixture position information
123 Anchor information
131 Terminal controller
132 Anchor selector
133 Fixture controller
134 Position estimator
321 RSSI information
331 Communication controller 332 Communication quality measurer
333 Measurement-result indicator

The invention claimed is:
1. A position estimation apparatus, comprising:
a selection circuit that selects a radio electronic device arranged in a second region as a first anchor used for estimating a position of a first mobile terminal and a radio electronic device arranged in a third region as a second anchor used for estimating a position of a second mobile terminal, based on first information, second information, and third information,
the first information being related to an arrangement of a plurality of radio electronic devices in a first region,
the second information being related to the second region within which the first mobile terminal is movable in the first region, and
the third information being related to the third region within which the second mobile terminal is movable in the first region, the third region including a region within which the first mobile terminal is not movable in the first region; and
an estimation circuit that estimates the position of the first mobile terminal based on third information related to radio communication quality between the first anchor and the first mobile terminal and on information related to the first anchor in the first information, and that estimates the position of the second mobile terminal based on information related to radio communication quality between the second anchor and the second mobile terminal and on information related to the second anchor in the first information, wherein
the second information is associated with a type of the first mobile terminal,
the third information is associated with a type of the second mobile terminal, and
the selection circuit identifies a type of a mobile terminal and uses the second information and the third information associated with the identified type.
2. The position estimation apparatus according to claim 1, wherein the selection circuit divides the second region into a plurality of divided regions and selects, in each of the plurality of divided regions, the first anchor from among radio electronic devices installed in the divided region, in a case where a number of radio electronic devices installed in the second region is greater than a predetermined number of the first anchors.
3. The position estimation apparatus according to claim 1, wherein,
the estimation circuit periodically performs transmission of acknowledgement requests to the first mobile terminal and the second mobile terminal, and
radio signals transmitted from the first mobile terminal and the second mobile terminal are acknowledgement responses that the first mobile terminal and the second mobile terminal have transmitted in response to the acknowledgement requests, the radio signals being a measurement targets of radio communication qualities.
4. The position estimation apparatus according to claim 3, wherein the selection circuit instructs the first anchor and the second anchor to start measuring the radio communication qualities of the radio signals transmitted from the first mobile terminal and the second mobile terminal.
5. The position estimation apparatus according to claim 1, wherein each of the radio electronic device arranged in the second region, the radio electronic device arranged in the third region, and the plurality of radio electronic devices is a lighting fixture operable by a radio signal.
6. The position estimation apparatus according to claim 1, wherein the radio communication quality between the first anchor and the first mobile terminal is a received signal strength indicator of a radio signal transmitted from the first mobile terminal, and the radio communication quality between the second anchor and the second mobile terminal is a received signal strength indicator of a radio signal transmitted from the second mobile terminal.
7. A position estimation system, comprising:
at least one radio electronic device; and
a position estimation apparatus that:
selects a radio electronic device arranged in a second region as a first anchor used for estimating a position of a first mobile terminal and a radio electronic device arranged in a third region as a second anchor used for estimating a position of a second mobile terminal, based on first information, second information, and third information,
the first information being related to an arrangement of a plurality of radio electronic devices in a first region,
the second information being related to the second region within which the first mobile terminal is movable in the first region, and
the third information being related to the third region within which the second mobile terminal is movable in the first region, the third region including a region within which the first mobile terminal is not movable in the first region; and
estimates the position of the first mobile terminal based on information related to radio communication quality between the first anchor and the first mobile terminal and on information related to the first anchor in the first information, and that estimates the position of the second mobile terminal based on information related to radio communication quality between the second anchor and the second mobile terminal and on information related to the second anchor in the first information, wherein
the second information is associated with a type of the first mobile terminal,
the third information is associated with a type of the second mobile terminal, and
the position estimation apparatus identifies a type of a mobile terminal and uses the second information and the third information associated with the identified type.
8. A position estimation method, comprising:
selecting, by a position estimation apparatus, a radio electronic device arranged in a second region as a first anchor used for estimating a position of a first mobile terminal and a radio electronic device arranged in a third region as a second anchor used for estimating a position of a second mobile terminal, based on first information, second information, and third information,
the first information being related to an arrangement of a plurality of radio electronic devices in a first region,
the second information being related to the second region within which the first mobile terminal is movable in the first region, and
the third information being related to the third region within which the second mobile terminal is movable in the first region, the third region including a region within which the first mobile terminal is not movable in the first region;

estimating, by the position estimation apparatus, the position of the first mobile terminal based on information related to radio communication quality between the first anchor and the first mobile terminal and on information related to the first anchor in the first information;

estimating, by the position estimation apparatus, the position of the second mobile terminal based on information related to radio communication quality between the second anchor and the second mobile terminal and on information related to the second anchor in the first information, the second information being associated with a type of the first mobile terminal, the third information being associated with a type of the second mobile terminal; and identifying, by the position estimation apparatus, a type of a mobile terminal and using, by the position estimation apparatus, the second information and the third information associated with the identified type.

* * * * *